(12) United States Patent
Johnson

(10) Patent No.: US 11,089,736 B2
(45) Date of Patent: Aug. 17, 2021

(54) HORTICULTURAL LIGHTING DEVICE

(71) Applicant: FAT JEFF Limited, St Albans (GB)

(72) Inventor: Andrew Johnson, Klosters (CH)

(73) Assignee: FAT JEFF Limited, Welwyn Garden (GB)

( * ) Notice: Subject to any disclaimer, the term of this patent is extended or adjusted under 35 U.S.C. 154(b) by 0 days.

(21) Appl. No.: 16/074,813

(22) PCT Filed: Feb. 3, 2017

(86) PCT No.: PCT/IB2017/050605
§ 371 (c)(1),
(2) Date: Aug. 2, 2018

(87) PCT Pub. No.: WO2017/134623
PCT Pub. Date: Aug. 10, 2017

(65) Prior Publication Data
US 2019/0059237 A1    Feb. 28, 2019

(30) Foreign Application Priority Data
Feb. 4, 2016    (GB) ...................... 1602029

(51) Int. Cl.
*H05B 47/105*    (2020.01)
*A01G 7/04*    (2006.01)
(Continued)

(52) U.S. Cl.
CPC ................ *A01G 7/045* (2013.01); *F21V 5/04* (2013.01); *F21V 15/01* (2013.01); *F21V 23/003* (2013.01);
(Continued)

(58) Field of Classification Search
CPC combination set(s) only.
See application file for complete search history.

(56) References Cited

U.S. PATENT DOCUMENTS

| 8,847,514 B1 | 9/2014 | Reynoso | |
|---|---|---|---|
| 2011/0302839 A1* | 12/2011 | Senders | A01G 7/045 47/66.6 |

(Continued)

FOREIGN PATENT DOCUMENTS

| WO | 2013027198 A1 | 2/2012 |
|---|---|---|
| WO | 2014188303 A1 | 11/2014 |
| WO | 2014195952 A1 | 12/2014 |

OTHER PUBLICATIONS

Pixels 2015 (Year: 2015).*

*Primary Examiner* — Anne M Hines

(57) ABSTRACT

A lighting device suitable for promoting plant growth, said lighting device comprising:—(i) a first group of LEDs comprising a plurality of LEDs adapted to generate a first emission spectrum having a peak between 450-460 nm (royal blue light); (ii) a second group of LEDs comprising a plurality of LEDs adapted to generate a second emission spectrum having a peak between 630-670 nm (crimson light); (iii) a third group of LEDs comprising a plurality of LEDs adapted to generate a third emission spectrum having a peak between 720-740 nm (cherry red light); (iv) a fourth group of LEDs comprising a plurality of LEDs adapted to generate white light; wherein the intensity of the light output generated by each group of LEDs is adjustable independently of the other groups.

18 Claims, 11 Drawing Sheets

(51) Int. Cl.
    *H05B 47/155*     (2020.01)
    *F21V 29/503*     (2015.01)
    *F21V 29/76*     (2015.01)
    *F21V 5/04*     (2006.01)
    *F21V 15/01*     (2006.01)
    *F21V 23/00*     (2015.01)
    *F21V 31/00*     (2006.01)
    *F21Y 113/13*     (2016.01)
    *F21Y 115/10*     (2016.01)

(52) U.S. Cl.
    CPC .......... *F21V 29/503* (2015.01); *F21V 29/763* (2015.01); *F21V 31/005* (2013.01); *H05B 47/105* (2020.01); *H05B 47/155* (2020.01); *F21Y 2113/13* (2016.08); *F21Y 2115/10* (2016.08); *Y02P 60/14* (2015.11)

(56) References Cited

U.S. PATENT DOCUMENTS

| | | |
|---|---|---|
| 2012/0043907 A1 | 2/2012 | Lu |
| 2012/0104977 A1 | 5/2012 | McKenzie |
| 2012/0218750 A1 | 8/2012 | Klase |
| 2013/0139437 A1 | 6/2013 | Maxik |
| 2013/0293156 A1 | 11/2013 | Wells |
| 2014/0215913 A1 | 8/2014 | Takeuchi |
| 2015/0230409 A1 | 8/2015 | Nicole |
| 2015/0305252 A1 | 10/2015 | Klase |
| 2015/0313092 A1 | 11/2015 | Pocock |

\* cited by examiner

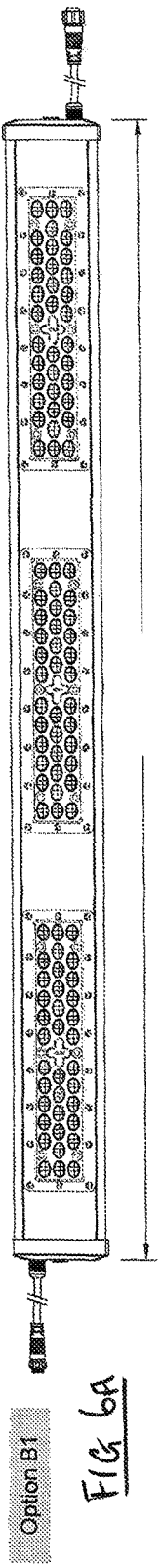
Option B1
FIG 6A
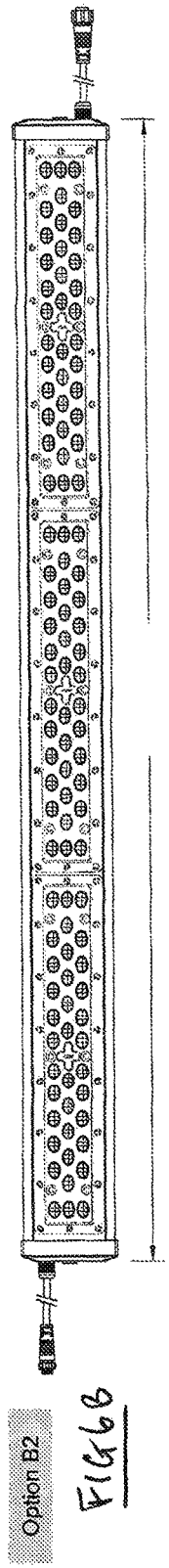
Option B2
FIG 6B
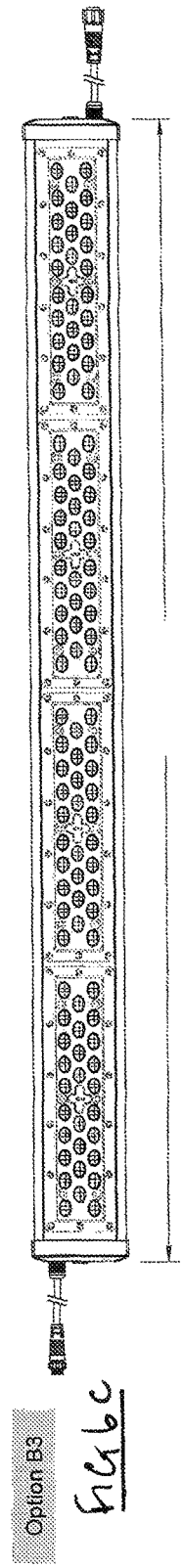
Option B3
FIG 6C
| | LED | Qty(pcs) | IF(input) | VF | 串S/并P | LED Watt(W) | Length(mm) |
|---|---|---|---|---|---|---|---|
| B1 | 玩I Cherry Red | 12 | 583 mA | 13.2V | 6S/2P | 7.7W | |
| B2 | 正 Royal Blue | 18 | 778 mA | 28.8V | 9S/2P | 22.4 | |
| | 深I Crimson | 30 | 700 mA | 33V | 15s2P | 23.1W | 1092 mm |
| | 白 White (6KK) | 48 | 700 mA | 36V | 12S4P | 25.2W | |
| | Total | 108 | | | | 78.4W | |
| B3 | 玩I Cherry Red | 16 | 437 mA | 17.6V | 8S2P | 7.7W | |
| | 正 Royal Blue | 24 | 583mA | 38.4V | 12S2P | 22.4 | |
| | 深I Crimson | 32 | 656 mA | 35.2V | 16S2P | 23.1W | 1092 mm |
| | 白 White (6KK) | 40 | 787 mA | 32V | 10S4P | 25.2W | |
| | Total | 112 | | | | 78.4W | |
FIG 6D

Growbar

| LED | nm | Qty (pcs) | IF (mA) max | Series | Parallel | VF (V) /LED | VF(V) Total | LED Watt Total |
|---|---|---|---|---|---|---|---|---|
| Royal Blue | 450-460nm | 18 | 700 mA | 6 | 3 | 3.2 | 19.2 | 13.44 |
| Red | 650-670nm | 30 | 700 mA | 10 | 3 | 2.2 | 22 | 15.4 |
| Far Red | 720-740nm | 12 | 700 mA | 4 | 3 | 2.2 | 8.8 | 6.16 |
| White | 6500K | 48 | 700 mA | 8 | 6 | 3.2 | 25.6 | 17.92 |
| | | 108 | | | | | LED,W | 52.92 |
| | | | | | | | SYS W | 55 |

Growbar Improvement

| LED | nm | Qty (pcs) | IF (mA) max | Series | Parallel | VF (V) /LED | VF(V) Total | LED Watt Total | % increase |
|---|---|---|---|---|---|---|---|---|---|
| Royal Blue | 450-460nm | 18 | 700 mA | 9 | 2 | 3.2 | 28.8 | 20.16 | 37.70% |
| Red | 650-670nm | 30 | 700 mA | 15 | 2 | 2.2 | 33 | 23.1 | 28.40% |
| Far Red | 720-740nm | 12 | 700 mA | 12 | 1 | 2.2 | 26.4 | 18.48 | 83.90% |
| White | 6500K | 48 | 700 mA | 12 | 4 | 3.2 | 38.4 | 26.88 | 21.80% |
| | | 108 | | | | | LED,W | 88.62 | |
| | | | | | | | SYS W | 95 | |

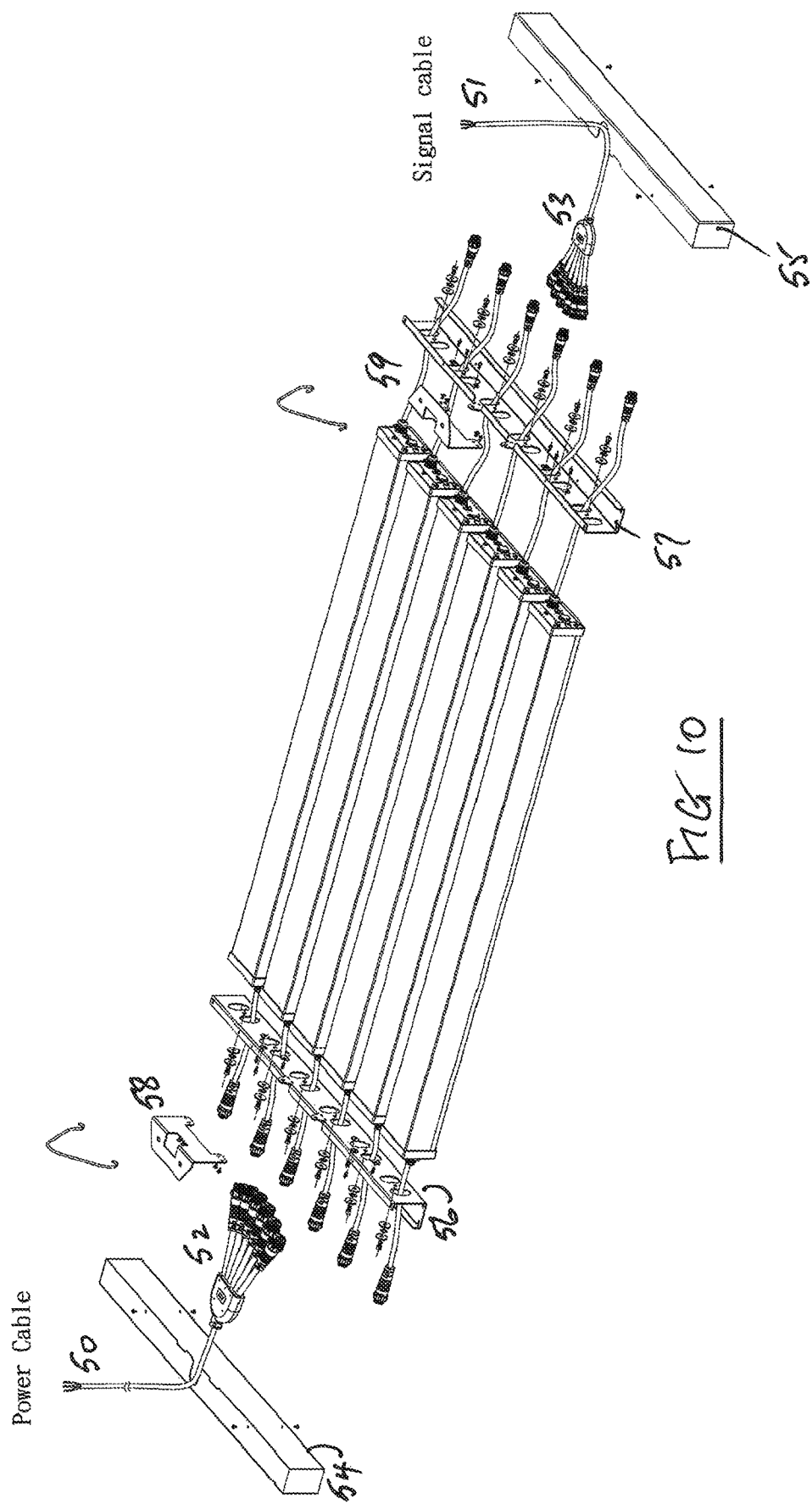

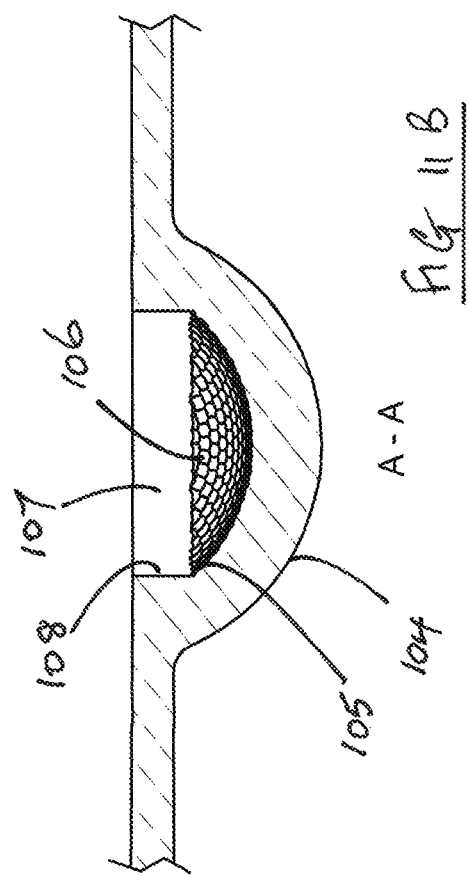
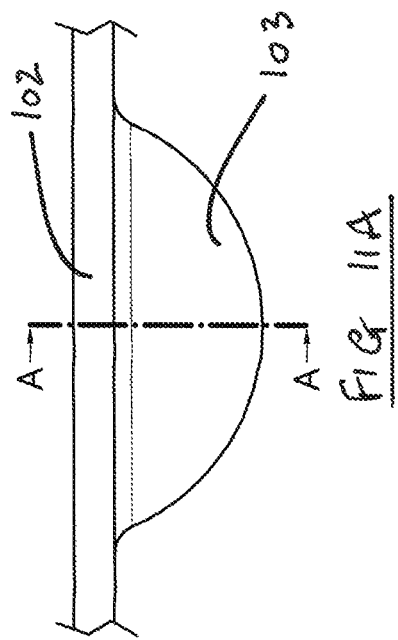
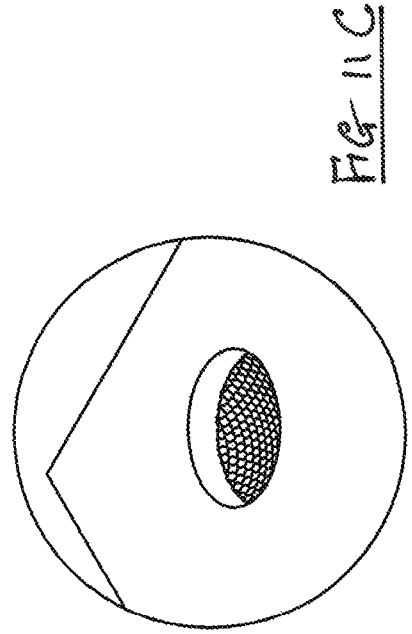

HORTICULTURAL LIGHTING DEVICE

FIELD OF THE INVENTION

The present invention relates to an LED lighting device suitable for stimulating plant growth and to a horticultural luminaire or light fitting comprising one or more LED lighting devices.

BACKGROUND TO THE INVENTION

There is an expanding demand to increase crop productivity, especially by growing crops under controlled growing conditions, such as within buildings. Growing crops under these conditions generally requires artificial or powered lighting instead of, or to supplement, natural daylight in the form of plant lights or grow lights. LED grow lights have proved particularly useful in horticultural applications because they provide bright, cost-effective long lasting light and can emit various wavelengths of light that have proved effective in encouraging photosynthetic processes in a wide range of plants.

Studies by plant biologists and horticulturalists have determined that plant crops generally benefit from different wavelengths of light at different stages of their growth cycle. Certain spectra have been determined as being particularly beneficial and these spectra have defined peaks or profiles in their emission spectra and have been given specific designations such as:—

F1 Spectrum—General purpose, high efficiency;
F3 Spectrum—Best for germination through flowering;
X5 Spectrum—Best for human visualisation of plants;
F6 Spectrum—Best for vegetative growth;
F7 Spectrum—Best for seedlings.

These spectra, which are given by way of example only, typically contain various amounts of blue and red light, as well as other frequencies. The desirable frequencies have been well-documented such as in "Plant Productivity in Response to LED Lighting" by Gioia D. Massa et. al., Hort, Science 2008, Vol 43(7) pp 1951-1956 and references cited therein. It is intended that this disclosure should form an integral part of this disclosure and is hereby incorporated by reference.

A problem arises for growers because of the different optimum light frequencies required at various stages of plant development. For example, seedlings are best grown under a light producing the F1 spectrum whilst a light producing the F6 spectrum is best for vegetative growth. To address these requirements it is necessary to either change the light fittings that are above or around the plants as they grow, or move the plants so that they are under light fittings giving off the optimum emission spectrum for a particular growth phase. Both of these options are time consuming and labour intensive. Alternatively, a light fitting giving out a compromise emission spectrum may be selected which is then used throughout the entire growth cycle.

Several grow lights are already on the market but their performance is sub-optimal in terms of being able to accommodate the optimum spectral emissions required during the whole of the growth cycle with minimum energy input. It is an object of the present invention to overcome or at least mitigate the short comings outlined above.

SUMMARY OF THE INVENTION

According to a first aspect of the present invention there is provided a lighting device according to claim 1. For example there is provided a lighting device suitable for promoting plant growth, said lighting device comprising:—
 (i) a first group of LEDs comprising a plurality of LEDs adapted to generate a first emission spectrum having a peak between 450-460 nm (Royal Blue light);
 (ii) a second group of LEDs comprising a plurality of LEDS adapted to generate a second emission spectrum having a peak between 630-670 nm (Crimson light);
 (iii) a third group of LEDs comprising a plurality of LEDs adapted to generate a third emission spectrum having a peak between 720-740 nm (Cherry Red light);
 (iv) a fourth group of LEDs comprising a plurality of LEDs adapted to generate white light;
 wherein the intensity of the light output generated by each group of LEDs is adjustable independently of the other groups.

This arrangement provides for the first time a grow light than can produce photosynthetically active radiation (PAR) across the full range of emission spectra required to cover all stages of plant growth from germination to cropping. Control circuitry is provided, either in the lighting device itself or remotely, to achieve the desired emission spectrum as required.

Preferably the lighting device further comprises a sensor array adapted to measure the density of plant growth. Data gathered by this sensor array provides information on which the optimum light emission spectrum can be selected for a particular stage of plant growth, and allows a shift in emission spectrum to take place automatically if desired.

Preferably the white light emitted by the fourth group of LEDs has a colour temperature between 4000-7000K, and more preferably between 5000-6000 K.

The ratio or relative proportion of the number of the respective groups of LEDs is an important feature of this invention, as this ratio can affect the overall efficiency of the lighting device. A preferred ratio of the number of LEDs from each group of LEDs in the lighting device is as follows:—
 Group 1: 6+/−3
 Group 2: 10+/−5
 Group 3: 4+/−2
 Group 4: 16+/−8.

More preferably the ratio of the number of LEDs from each group of LEDs in the device is as follows:—
 Group 1: 6+/−1
 Group 2: 10+/−2
 Group 3: 4+/−1
 Group 4: 16+/−6.

In a particularly preferred embodiment the ratio of the number of LEDs from each group of LEDs in the device is as follows:—
 Group 1: 6
 Group 2: 10
 Group 3: 4
 Group 4: 16.

In a further particularly preferred embodiment the ratio of the number of LEDs from each group of LEDs in the device is as follows:—
 Group 1: 6
 Group 2: 8
 Group 3: 4
 Group 4: 10.

Preferably the lighting device is devoid of LEDs having a peak in their emission spectrum between 500-600 nm (green light).

Preferably the lighting device further comprising dimming/control circuitry adapted to allow the emission spectrum of the light emitted by the device to be controlled by an operator, the light output of each Group of coloured and white LEDs being controllable independently of the other Groups.

According to a further embodiment of the invention there is provided a lighting device suitable for promoting plant growth, said lighting device comprising:—
  (i) a first group of LEDs comprising a plurality of LEDs adapted to generate a first emission spectrum having a peak between 450-460 nm (royal blue light);
  (ii) a second group of LEDs comprising a plurality of LEDS adapted to generate a second emission spectrum having a peak between 630-670 nm (crimson light);
  (iii) a third group of LEDs comprising a plurality of LEDs adapted to generate a third emission spectrum having a peak between 720-740 nm (cherry red light);
  (iv) a fourth group of LEDs comprising a plurality of LEDs adapted to generate white light;
  the intensity of the light output generated by each group of LEDs being adjustable independently of the other groups;
wherein the lighting device further comprises a housing comprising a main body and a heat sink, the LEDs being mounted in thermal contact with the heat sink and the heat sink being in good thermal contact with the main body, such that heat from the heat sink is dissipated through the main body.

This embodiment of the invention may incorporate all of the other features describes above and herein. Furthermore, the various concepts described herein can be used independently of each other or in any suitable combination and are no way mutually exclusive.

According to a still further embodiment of the invention there is provided a lighting device suitable for promoting plant growth, said lighting device comprising:—
  (i) first group of LEDs comprising a plurality of LEDs adapted to generate a first emission spectrum having a peak between 450-460 nm (royal blue light);
  (ii) a second group of LEDs comprising a plurality of LEDS adapted to generate a second emission spectrum having a peak between 630-670 nm (crimson light);
  (iii) a third group of LEDs comprising a plurality of LEDs adapted to generate a third emission spectrum having a peak between 720-740 nm (cherry red light);
  (iv) a fourth group of LEDs comprising a plurality of LEDs adapted to generate white light;
  the intensity of the light output generated by each group of LEDs being adjustable independently of the other groups;
wherein the lighting device further comprises an array of lenses, each lens comprising a light entering section in the form of a blind recess and a light emitting section, the outer surface of the light emitting section being substantially hemispherical and at least part of the internal, light receiving surface of the light entering section incorporating a high density of small convex facets.

According to a further aspect of the present invention there is provided a light fitting suitable for promoting plant growth, said light fitting comprising:—
  a housing;
  one or more lighting devices according to an aspect of the invention;
  a power supply;
  a driver;
  a connection to a control module.

BRIEF DESCRIPTION OF THE DRAWINGS

Preferred embodiments of the present invention will now be described, by way of example only, with reference to the accompanying drawings wherein:—

FIGS. 6A, 6B and 6C illustrate possible arrangements of a series of lighting devices on a heat sink;

FIG. 6D shows, as a tabulated summary, examples of the different coloured LEDs used in options B1, B2 and B3 along with their key parameters;

FIGS. 8, 9 and 10 show one lighting device, three lighting devices and 6 lighting devices respectively mounted on a suitable frame;

FIG. 11A to 11C show side, cross section and perspective views of one typical lens from a lens array.

DESCRIPTION OF THE PREFERRED EMBODIMENTS

The present invention will now be described by way of examples only. These are not the only ways that the invention may be put into practice, but they are the best ways currently known to the applicant.

Figure 1:
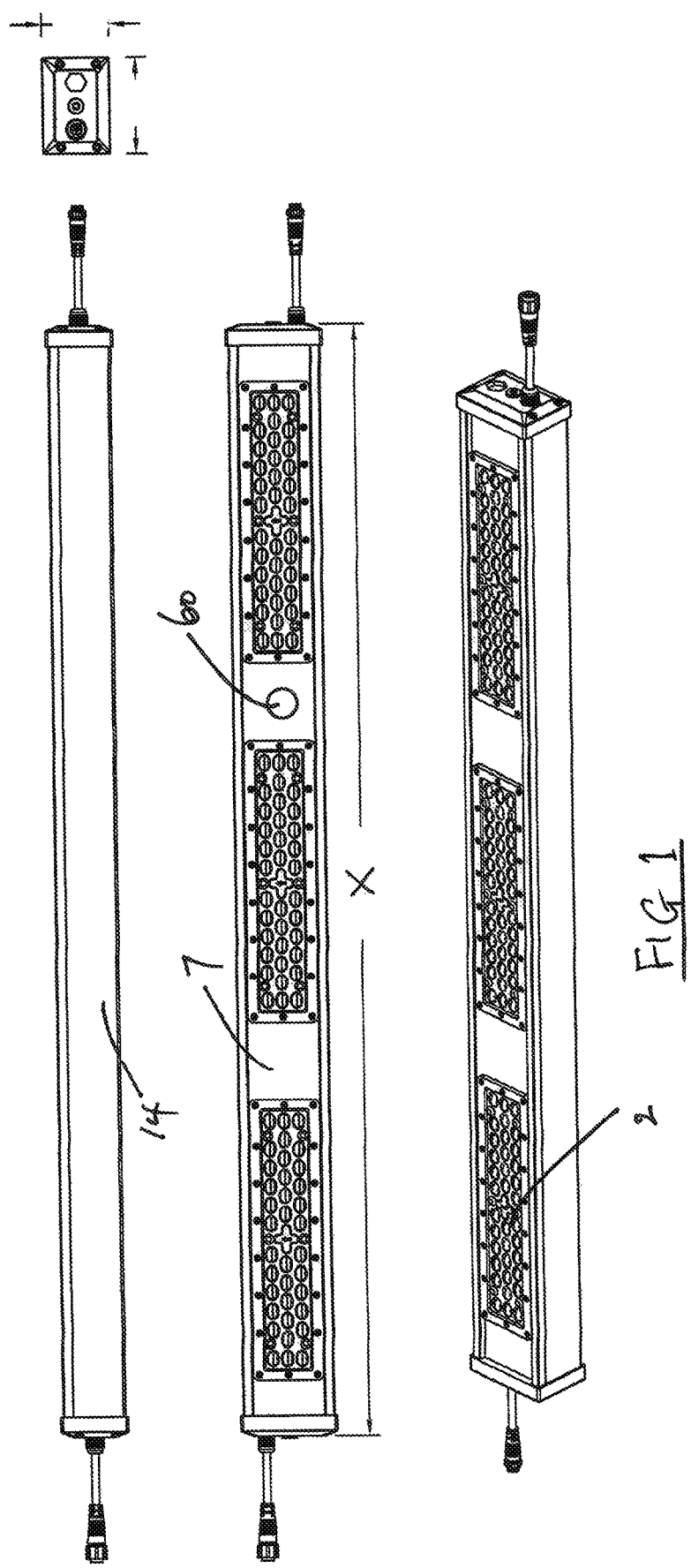
FIG. 1 illustrates side, plan and perspective views of a light fitting including three lighting devices according to a first aspect of the present invention.

Referring to FIG. 1, this illustrates an assembled light fitting 30, the housing of which comprises a main body 14, a heat sink top or gear tray 7 and two end caps 12. On the outer surface of the heat sink top 7 are mounted three LED modules 5, each covered by a lens array 2. This construction arrangement is shown in more detail in the exploded diagrams illustrated in FIGS. 2 and 3. The housing is preferably formed from an extruded material that has good thermal conductivity, such as a metal like aluminium or thermally conductive plastic. Aluminium is a preferred construction material due to its strength and high thermal conductivity, in order to conduct heat away from the LED modules mounted on the outside of the housing. For clarity, Table 1 below sets out a list of components shown in FIGS. 1 to 5.

TABLE 1

| Item | Name |
| --- | --- |
| 1 | Stainless steel hex socket screw |
| 2 | Lens |
| 3 | Waterproof seal 1 (Gasket 1) |
| 4 | Cross head screw |
| 5 | LED module |
| 6 | Flat head screw |
| 7 | Heat sink |
| 8 | Wire nut |
| 9 | Cross head screw |
| 10 | Cable |
| 11 | Cable gland |
| 12 | Cover |
| 13 | Water proof seal 2 |
| 14 | Main body |
| 15 | Power Driver |
| 16 | Control Driver |
| 17 | Water proof seal 3 |
| 18 | Stainless steel hex socket screw |

TABLE 1-continued

| Item | Name |
|------|------|
| 19 | Signal Cable |
| 20 | External star lock washer |
| 21 | Spring washer |
| 22 | Earth terminal |
| 23 | Earth cable |
| 24 | Cable1 |
| 25 | Cable2 |
| 26 | Cable3 |
| 27 | Cable4 |

A power driver 13 and a control driver 16 are located inside the housing, together with various other electrical connections and electronic components. The housing is made watertight by gaskets 3 located around the perimeter of the lens arrays 2, waterproof seals 17 along each long, side edge of the housing 14, and end seals inside the end caps or covers 12.

Figure 4:
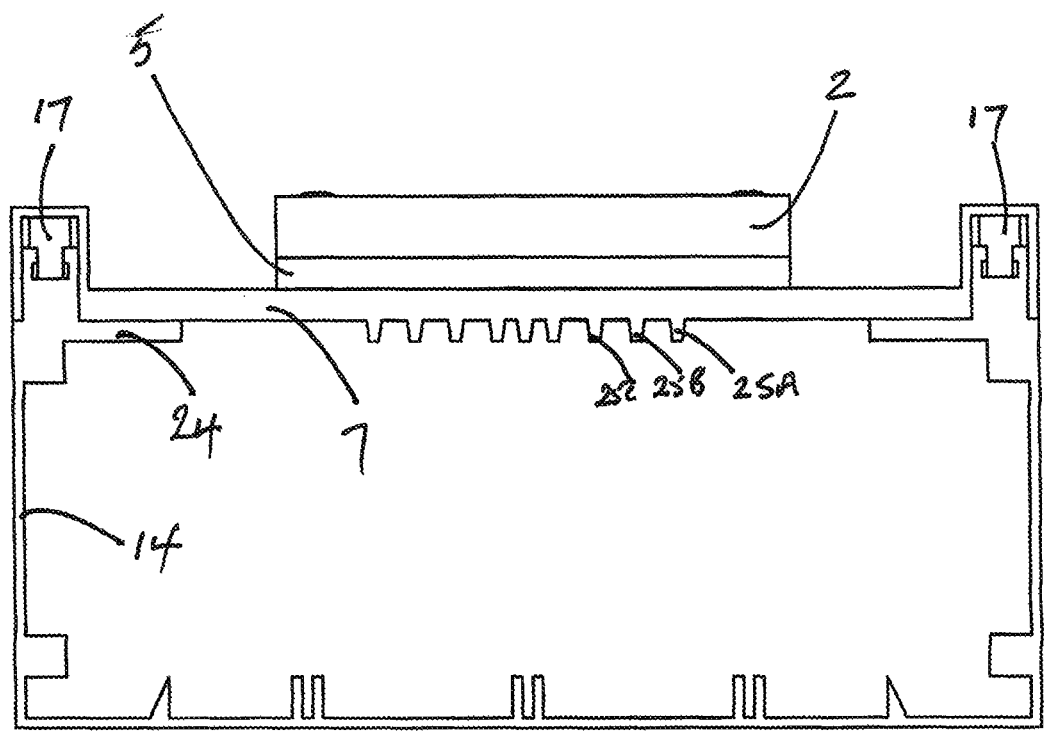
FIG. 4 illustrates a cross-sectional view of the main body and cover of a light fitting in an assembled state.
Figure 5:
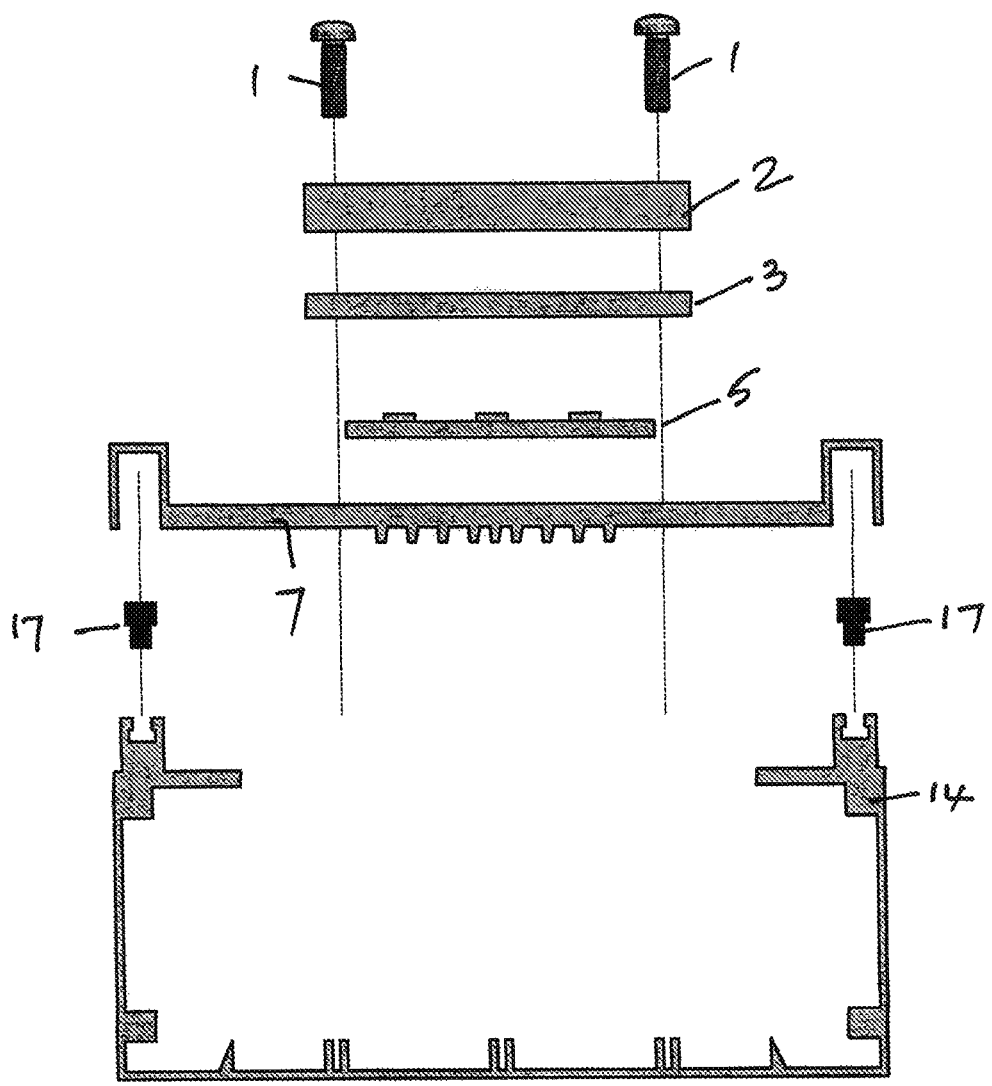
FIG. 5 illustrates the components shown in FIG. 4 in an exploded format.

FIGS. 4 and 5 show cross-sectional views of the light fitting in assembled and exploded views respectively. These show a housing main body 14 closed by a heat sink 7 and sealed by two waterproof seals 17. On the top of the heat sink 7, and in direct thermal contact with it, is an array of LEDs in a LED module 5 enclosed by a lens array 2 to create an LED array which in turn is sealed to the heat sink by a gasket 3. Importantly, the heat sink 7 is in good thermal contact with an inwardly directed shoulder or flange 24 on the inside of the housing 14. This thermal contact can be improved by the use of a suitable thermally conductive interface if desired. By way of example, suitable thermally conductive interfaces include thermally conductive grease, thermally conducting pads, graphite foil, or thermally conductive acrylic film. In this arrangement heat generated by the LED arrays is transmitted into the heat sink 7 and then away from the heat sink by convection, partly by way of a series of fins 25A, 25B, 25C etc on the underside of the heat sink 7. Heat is also dissipated from the heat sink by conduction into the body of the housing 14. It is to be noted that the arrangement and location of waterproof seals 17, which are located in a seat in housing 14 and engage with a slot in heat sink 7, do not interfere with heat conduction from the LEDs via heat sink 7, flange or shoulder 24 and housing 14. Other arrangements of locating waterproof seals 17 between heat sink 7 and housing 14 which permit conduction of heat between heat sink 7 and housing 7 are possible. In this way heat from the LEDs can be dissipated by conduction, convection and radiation in order to keep the operating temperature of the LEDs within a desired temperature range.

The lens array 2 covering each LED module is typically formed from a plastics material such as a polycarbonate and is advantageously a multi faceted lens comprising a plurality of substantially hemispherical substantially hollow individual lenses held in a matrix array. An individual LED is housed within the hollow interior or light entering section of each lens and the inside of the hollow surface of each lens comprises a plurality of substantially convex refractive facets as shown in FIG. 11. FIG. 11A shows an enlarged side view of one of the lenses in a lens array as shown in FIG. 11C. FIG. 11B shows an enlarged cross section along line A-A of FIG. 11A. In combination, these Figures show that each individual lens is formed from two curved surfaces 104 and 105. The outer curved light emitting surface or section 104 is generally or substantially hemispherical, although it is typically less than a complete hemisphere, as can be seen from FIG. 11B. Part of the inner or light receiving surface of the lens 105 is also curved, following a similar curve to the curve of outer surface 104. This inner surface 105 has a number of important features. Firstly, the curved part of its surface incorporates a large number of densely distributed convex facets 106. These facets cause refraction of the light from the LED that strikes them and this refraction results in a much more even spread of light than would otherwise be the case. The outer edge 108 of the inner surface 105 is substantially planar and creates a space 107 to accommodate an LED light engine in the light entering section. Any light that strikes surface 108 will tend to be reflected back into the interior of the lens by total internal reflection.

The curvature of the lens surfaces 104 and 105, and the curvature, number and dimensions of the convex facets 106, results in a lens with a controlled beam angle. Using this lens arrangement it is possible to focus the light produced by each LED into a beam of light having a beam angle of approximately 55 degrees, preferably between 45 and 70 degrees. This beam angle allows the light to be focussed onto a group of plants growing under that particular light, and also causes light from different coloured LEDs in an array to overlap, thus providing an area of very uniform spectral illumination with a mix of wavelengths, depending on which LEDs are illuminated.

One advantage of using a hollow, substantially hemispherical lens with internal convex facets, where the LED is housed within the hemisphere, is that light emitted from the side of the LED is reflected back into the lens by total internal reflection. Light emitted from the LED in a more forward direction may be subject to refraction, total internal reflection or may pass directly out through the front of the lens, depending on exactly where it strikes the inside of the internal hemispherical face of the lens. This results in a very even distribution of light arriving on the plant canopy beneath the lighting device.

An important feature of this type of lens is the high density of small convex facets on the internal, light receiving face of the hemispherical shell. LED light engines are small, and therefore the internal diameter of the hemispherical shell across the region 107 is also small, typically being in the order of 7-15 mm. Typically there are at least 50 convex facets, and preferably greater than 100 facets 106, on the internal hemispherical surface 105 of such a lens, even more preferably greater than 150 facets.

In summary, each lens in the lens array comprising a light entering section in the form of a blind recess and a light emitting section, the outer surface of the light emitting section being substantially hemispherical and at least part of the internal, light receiving surface of the light entering section incorporates a high density of small convex facets.

However, it will be understood that any suitable lens array may be used in this application as selected by the materials specialist. The lens array both protects the LEDs from damage and focuses the light from each LED to the desired beam angle as determined by the application the light fitting will be used for, and by a horticultural expert. A typical beam angle is 55 degrees but smaller or larger beam angles can be used, depending on the area of plants to be lit and the distance the light fittings are positioned from the plants.

Figure 2:
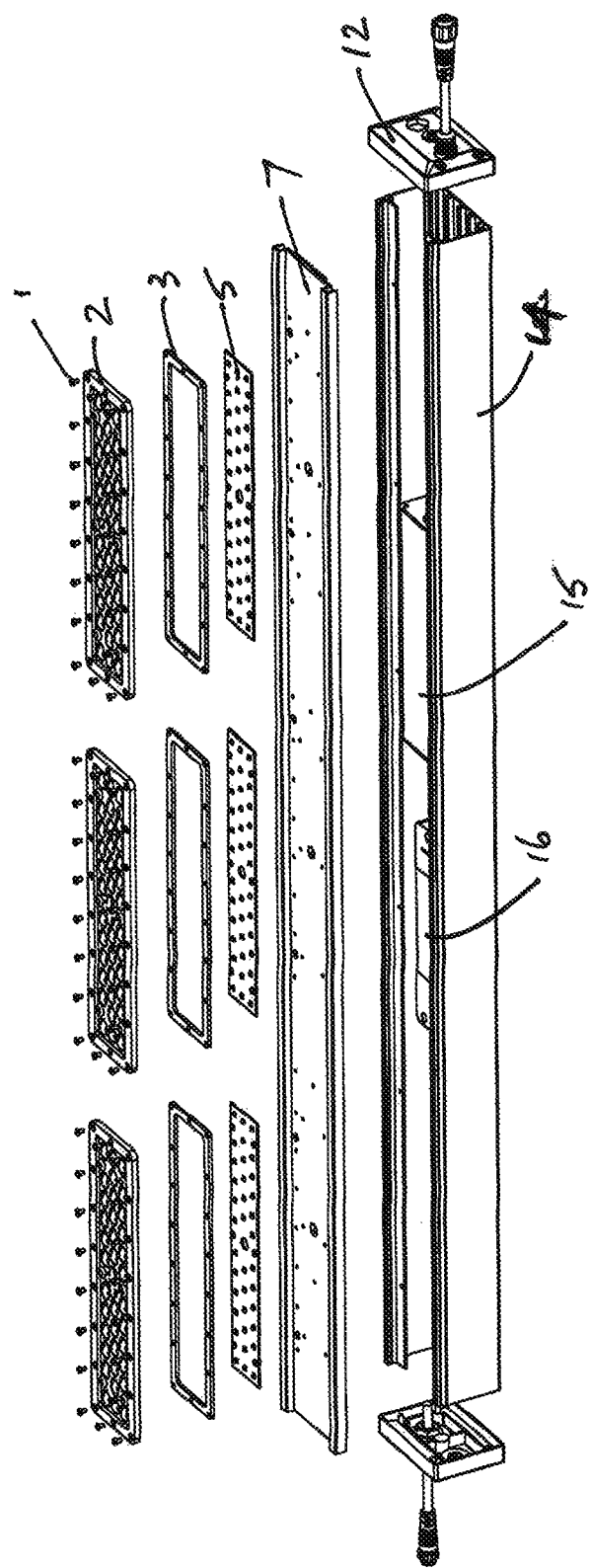
FIG. 2 illustrates an exploded view of the light fitting shown in FIG. 1.
Figure 3:
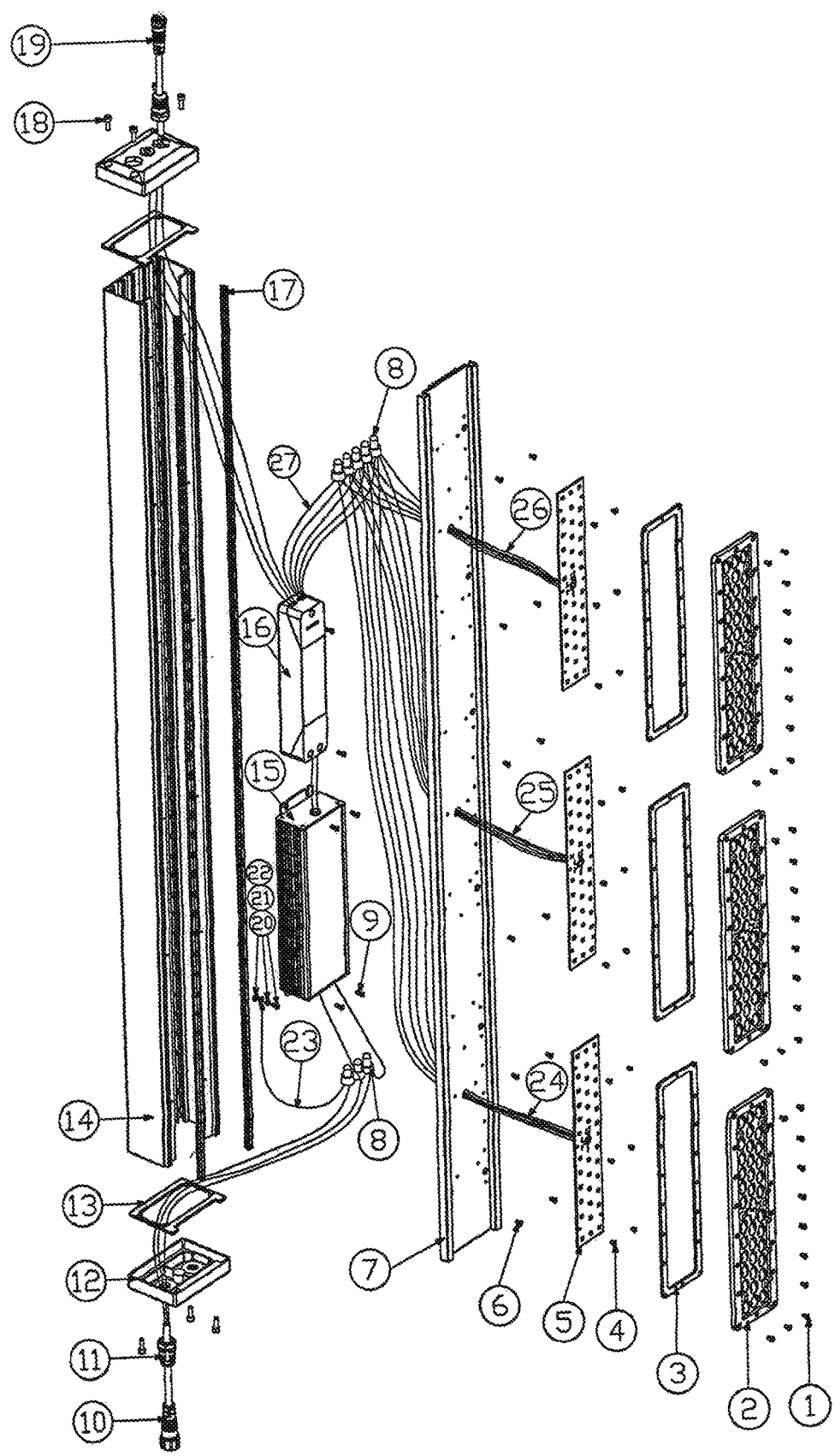
FIG. 3 illustrates a further exploded view showing a possible wiring arrangement.

It will be understood that while the example shown in FIGS. 1 to 3 show three LED modules in a linear array, any suitable number of LED modules can be used, and these need not necessarily be arranged in a linear fashion. For example, FIG. 6C shows four LED modules in a linear array. The length X of the main body may vary as required but a typical length may be in the order of 1070 mm or 42 inches. Longer or shorter housings are also envisaged.

An important feature of the present invention is the number and colour of the individual LEDs present in each module. An LED module, along with the necessary power and control circuitry to enable the LEDs to emit light having a desired spectrum, form a lighting device according to the present invention. Where a number of lighting devices are arranged in the same housing they can share power and control components to save on both cost and space.

Figures 7A, 7B:
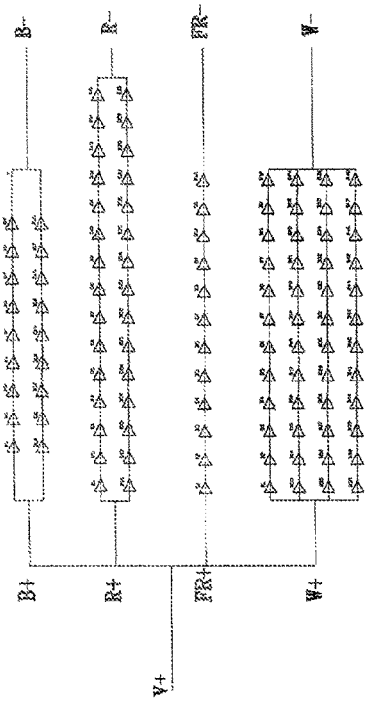
FIGS. 7A and 7B show the effect on Watt output per LED of two different wiring arrangements for connecting groups of individual LEDs in series and in parallel, the arrangement in FIG. 7B being an improvement to that shown in FIG. 7A.
Figure 8:
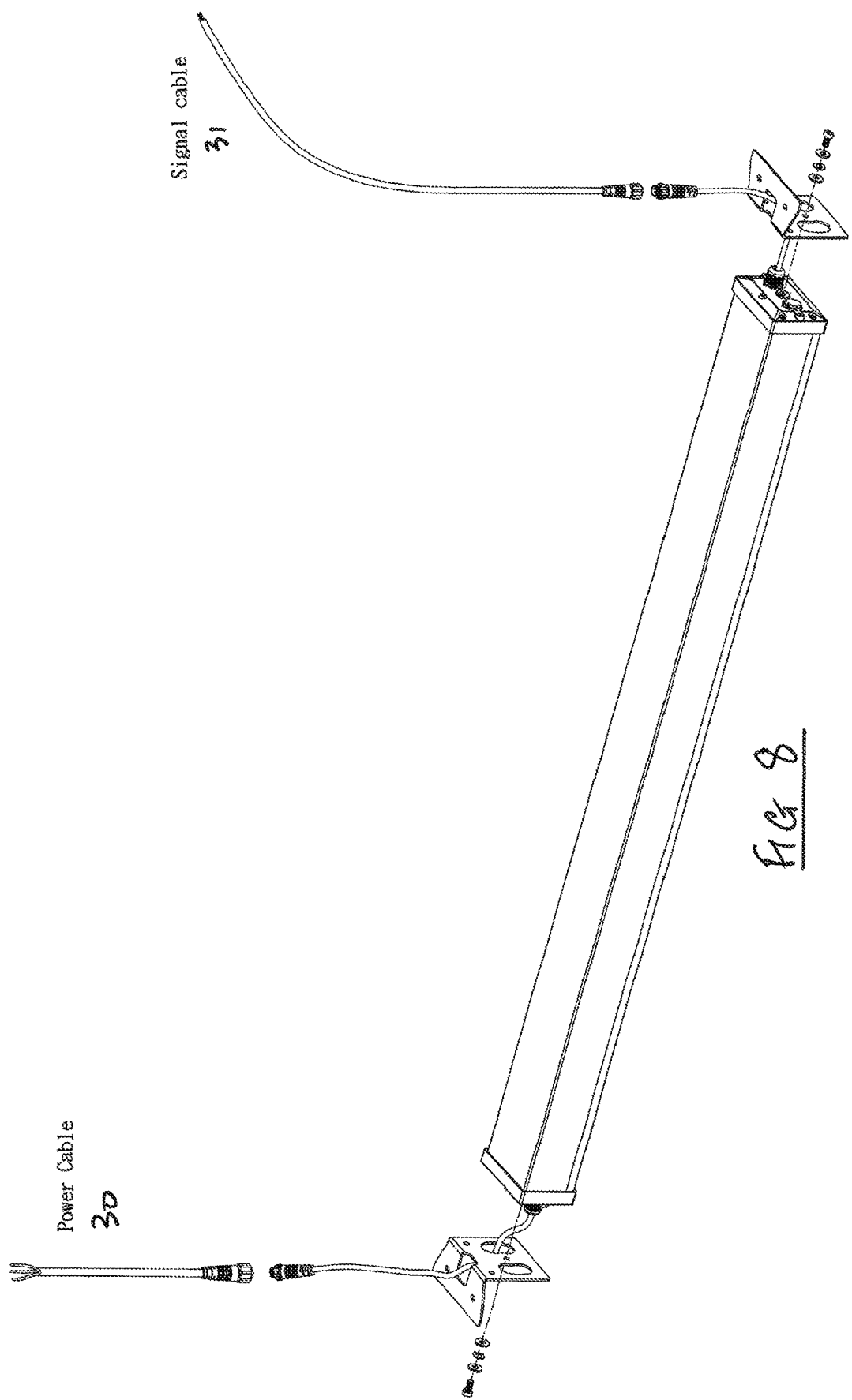

FIG. 6 shows just three of many possible arrangements of LEDs in an LED array and the Table in FIG. 6D details the total number of LEDs of each colour in the complete light fitting. Further information is given in FIG. 7, which shows two possible ways of wiring the four colours of LEDs in a module. In each example there are 18 blue, 30 crimson, 12 cherry red and 48 white LEDs in total in the module. FIGS. 7A and 7B show the advantage in terms of LED Watt output of wiring LEDs of the same colour in series, and groups of LEDs of the same colour in parallel. By increasing the number of LEDs wired in series it is possible to increase the output by as much as 40%.

Each LED module has LEDs of four carefully selected different colours, namely Royal Blue with an emission peak at 450-460 nm (Group 1), Crimson with an emission peak at 650-670 nm (Group 2), Cherry Red with an emission peak at 720-740 nm (Group 3), and White with a colour temperature of around 6000K (Group 4). White light is important because it not only includes other wavelengths useful to plants, but it also allows the grower to view the plants in a more natural light to assess the health of the plants.

The number of each Group of LEDs, especially the ratio between the numbers in each Group, is an important feature of this invention. Some preferred quantities are shown in the Table in FIG. 6D. For example, in Options B1 and B2 there are a total of 3 LED modules having 36 individual LEDs in each module, making a total of 108 individual LEDs in the whole light fitting. In this example there are 18 Group 1 LEDs (Royal Blue), 30 Group 2 LEDs (Crimson), 12 Group 3 LEDs (Cherry Red) and 48 Group 4 LEDs (White). This is a particularly advantageous number or ratio of each Group of LEDs in order to achieve the desired emission spectra to cover all growth stages of a wide variety of plants with the minimum energy input.

In the case of Option B3 there are a total of 4 LED modules having 28 individual LEDs in each module, making a total of 112 individual LEDs in the whole light fitting. In this example there are 24 Group 1 LEDs (Royal Blue), 32 Group 2 LEDs (Crimson), 16 Group 3 LEDs (Cherry Red) and 40 Group 4 LEDs (White). This is also a particularly advantageous number or ratio of each Group of LEDs in order to achieve the desired emission spectra to cover all growth stages of a wide variety of plants with minimum energy input.

It will be appreciated that the number or ratios of individual LEDs of each colour Group need not be exactly to the numbers or ratios given in these two examples in order to achieve excellent plant growth results. A preferred ratio of the number of LEDs from each group of LEDs in a lighting device is as follows:—
  Group 1: 6+/−3
  Group 2: 10+/−5
  Group 3: 4+/−2
  Group 4: 16+/−8.

A further preferred ratio of the number of LEDs from each group of LEDs in a lighting device is:—
  Group 1: 6+/−1
  Group 2: 10+/−2
  Group 3: 4+/−1
  Group 4: 16+/−6.

Figure 9:
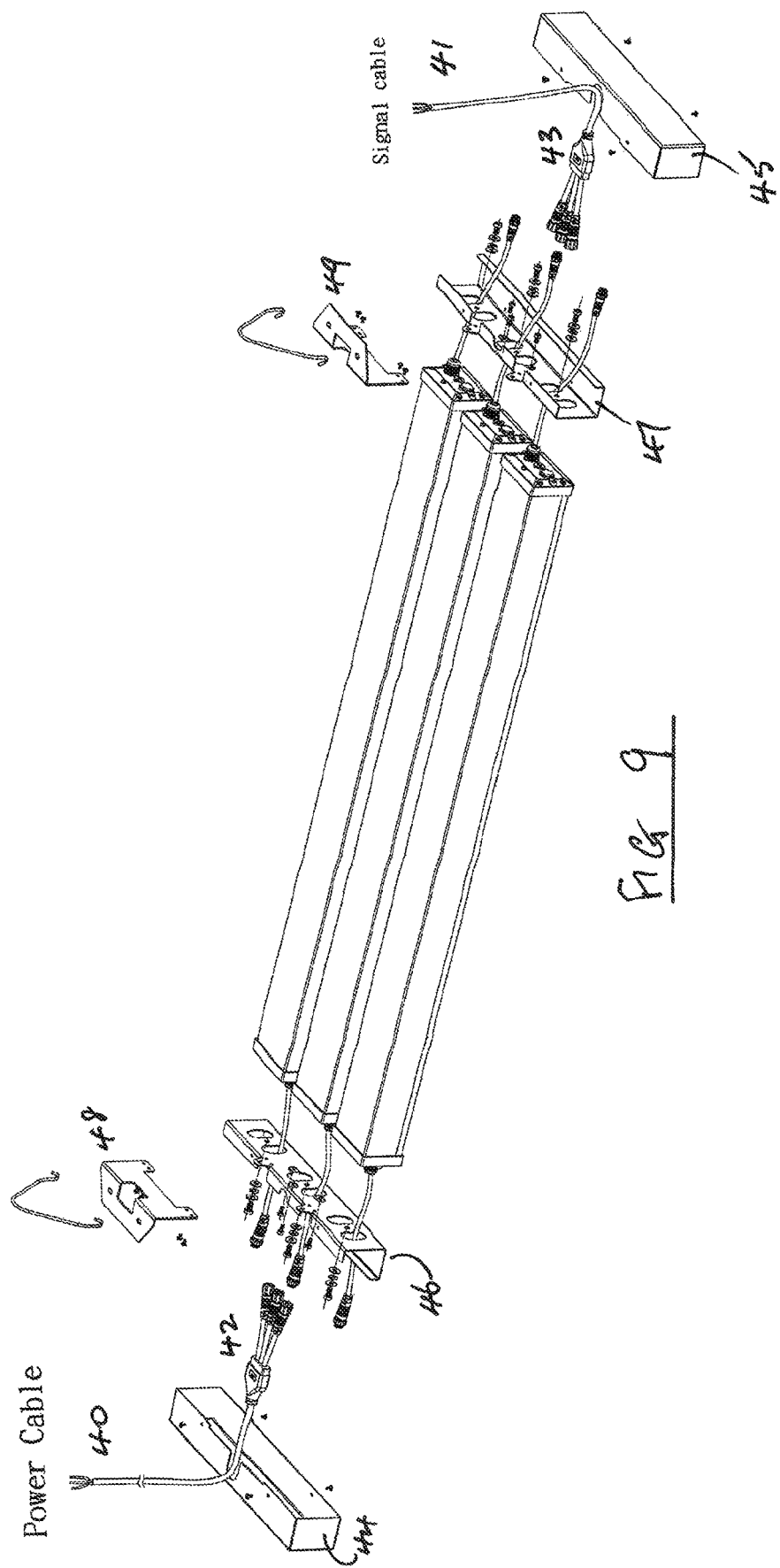

In use, a number of these light fittings can be mounted side by side in a substantially parallel corresponding end alignment fashion to give a battery of light fittings in one modular lighting unit. This type of arrangement is shown in FIGS. 9 and 10, which also show how a power cable 40, 50 can be slit into the required number of power supplies to power individual lighting devices. The splitting connectors 42, 52 can be contained and concealed within an end housing 44, 46 and 54, 56 respectively. Similarly signal cables 41, 51 can be combined in a similar fashion using connectors 43, 53 which can also be housed in housings 45, 47 and 55, 57 respectively.

The present design therefore allows for a flexible, modular lighting system in that any suitable number of light fittings or lighting devices can be mounted side-by-side using suitably designed end connectors and covers or housings. These end connectors serve to attach the required number of lighting units in a fixed array, accommodate the required connecting wires between each lighting unit, provide a single connection from each module into both the power and control circuits, and provide suspension or mounting points 48, 49 and 58, 59 to mount the lighting module over or around plants.

Advantageously the individual light fittings in an array can be angled as required with respect to the other light fittings. A common configuration has the outermost light unit on each side of the module angled inwards slightly such that the emitted light is kept in a defined light pattern to illuminate a desired number of plants, where these are being grown in defined rows.

A plurality of these modular lighting units is then mounted over or around the plants to be illuminated. These lighting units can be wired in series or in parallel using DMX splitters as necessary to connect the lighting units back to a main control panel. A proprietary DMX controller can be used to control the individual LEDs in order to select the desired spectrum for optimum plant growth at various stages of a plant's development. The components and circuitry necessary to control the light output from groups of LEDs of a particular colour in order to create the necessary spectral emissions are known per se and the control system would be designed by the appropriate person skilled in the art. For example, all the LEDs of one colour could be run at the same level of illumination or a percentage run at full power and the others turned off, as required, to create the desired spectra.

Using the lighting apparatus described above it is possible for a grower to set up a sequence of growing conditions made up of a number of scenes. Below are typical set up instructions.

Setting Instructions
  1. Set up the first Sequence and the desired period of days.
  2. Set up the Scene condition for the 1st sequence. The user can set up to 3 Scenes for every sequence. Time sum up for all the 3 scenes is 24 hours.
  3. Press Save button.
  4. Set up the 2nd sequence and repeat the above steps 1 to 3.
  5. A maximum of up to 12 sequences may be set.
Example:
  1. Set up 1st sequence for 30 days
  2. Choose Scene 8, start from 00:00 to 24:00
  3. Save the above condition
  4. Set up 2nd sequence for another 40 days
  5. Choose Scene 3, start from 00:00 to 12:00
  6. Save the above condition
  7. The light will run at Scene 8 for 24 hours everyday then automatically switch to Scene 3 after 30 days with 12 hours on and 12 hours off for 40 days.

A further important feature of light fittings according to the present invention is the incorporation of one or more sensor arrays into or associated with the fitting. Custom engineered micro sensing arrays are known, for example those supplied by Gooee Limited of 360 Central Ave, Suite 950, St. Petersburg Fla., 33701 United States (www.gooee.com). Custom engineered sensing ASICs, designed to capture environmental data and human activity, along with the capability to monitor LED chip performance are therefore known per se. Facing downwards, these sensors can detect motion, direction, footfall, ambient light levels and temperature. Facing upwards these sensors are able to monitor light output, colour temperature, quality and operating temperatures. These ASICs are now very small, around 5 mm by 5 mm, and can easily be accommodated into a light fitting in any suitable location, such as item 60 in FIG. 1. Wiring to such a sensor is not shown in subsequent Figures for clarity reasons.

The forward facing sensor array may include a low resolution monochromatic complementary metal oxide semiconductor (CMOS) device. This type of sensor acts as a low resolution camera and typically has a viewing angle of about 60 degrees using a 32×32 pixel array. This viewing angle corresponds favourably with the beam angle of the LEDs in the lighting array. Thus any plants being grown under such a lighting device will inevitably fall within the viewing angle of a CMOS device mounted on the front of the light fitting. It should be noted that these sensor are normally monochromatic and will therefore only output in greyscale Currently, typical applications for CMOS devices are as movement detectors, by calculating motion and direction in its viewing angle, and as daylight sensors giving the ability to measure ambient lighting. However, in the present application the CMOS device is being used in a new, inventive way to measure plant density. Plant density can be measured as the number of pixels that are significantly different to the surrounding pixels. That is to say the leaves of a plant will have a different colour density to the background colour around the plants. As the plants grow, the number of pixels different to the background will increase, giving a measure of the plant density. Using white light to take these density measurements tends to give the most accurate results. However, some experimentation with different crops may be necessary using different LED colours in the LED arrays to identify which LED colour or LED colour combination gives the highest contrast between the plant foliage and the background on the sensor for that particular crop and therefore gives the most accurate results.

It is envisaged that at the end of each period of plant illumination using a particular light spectrum, the LEDs used in that period will be turned off and the white LEDs will be turned on for just long enough for the CMOS device to take a reading. The pixel values will be stored in a data storage device and compared with data captured previously. When the pixel density reaches a pre-determined level, or when there has been an increase in pixels associated with the plants by a pre-determined percentage, then this will indicate that the light spectrum should be changed to the next spectrum required in the plant growing cycle. This can be done as an alert to an operator or by an automatic switching arrangement via the control software.

By having a number of these lighting devices incorporating a sensor array strategically placed around the growing area, variations in growing conditions can be accounted for. It may be for example that a sensor of this type can be incorporated into one of the lighting devices in each bank of devices as shown in FIG. 10. In that way individual growing control can be achieved for each batch of plants. This provides, for the first time, an indoor equivalent to outdoor precision farming.

The sensor array is also capable of measuring daylight contribution. Dependant on the growing environment, daylight may or may not be present. In the event that daylight is present, the sensor will provide sufficient data to control and manage the artificial light, if required. Dependant on sensor placement, it may be able to identify direct sunlight (high daylight contribution) or diffuse sunlight (low daylight contribution), and this will identify the quantity of supplemental artificial light required from the horticultural luminaire.

A further use for sensor arrays is to measure the temperature of the plants underneath a lighting device. A separate sensor to the one used to detect plant density is required, but again these are small in size, being around 5 mm by 5 mm. The temperature of the plant canopy is important, because if the plants become too hot their growth is inhibited, bleaching or wilting may occur, and the plants may even die. In the event of the plants reaching a temperature above an agreed threshold an alarm can be sent to the operator to take the necessary remedial action. For example, the LEDs can be moved further away from the plants, run at a reduced output, or even turned off completely. Again this can be done by an alert to an operator or automatically via the control software. Other actions may be appropriate, depending on what type of crop is being grown Data from these sensors can be transmitted wirelessly using one or more known protocols such as Mesh Bluetooth Low Energy (MBLE), Bluetooth Mesh, WLAN or ZigBee. Beacon technology can also be used.

Using a further sensor array, this time directly facing the LED light source, as a fixed or remote sensor to the luminaire, an RGB array is capable of tracking the performance of the luminaire, using machine learning algorithms to correlate RGB sensor data to real world lighting metrics such as lumen maintenance and colour temperature. Such a sensor is best placed at plant canopy level and it could be wired or wireless. A wireless version consisting of a separate product that would form part of an entire lighting and control system is envisaged. A wired version would preferably require a wired connection point in the luminaire (not shown). Horticultural lights with these sensor arrangements are, it is believed, unique.

Benefits of incorporating a sensor array at the canopy level are:—

1) Usable light falling on the canopy can be measured. Algorithms have the ability to correlate RGB values to usable PAR output of a horticultural light. This can be used to identify if the luminaire is correctly placed for maximum benefit.

2) Reduction in luminaire performance can be measured and steps taken to accommodate this. For example, the luminaire could be moved slightly closer to the plants. As an alternative, if say a 10% reduction in light output is anticipated over the working life of the horticultural light, then it could be run at a level 10% below full output from the outset. That gives the possibility of increasing its output over time to take account of reduced performance with age in a deliberate and measured way.

The invention claimed is:

1. A lighting device suitable for promoting plant growth, said lighting device comprising:—
   (i) a first group of LEDs comprising a plurality of LEDs adapted to generate a first emission spectrum having a peak between 450-460 nm (royal blue light);

(ii) a second group of LEDs comprising a plurality of LEDS adapted to generate a second emission spectrum having a peak between 630-670 nm (crimson light);
(iii) a third group of LEDs comprising a plurality of LEDs adapted to generate a third emission spectrum having a peak between 720-740 nm (cherry red light);
(iv) a fourth group of LEDs comprising a plurality of LEDs adapted to generate white light;
the intensity of the light output generated by each group of LEDs being adjustable independently of the other groups;
wherein the lighting device further comprises a sensor array adapted to measure the density of plant growth, said sensor array comprising a low resolution CMOS device configured to measure a number of pixels corresponding to the leaves of a plant and a number of pixels corresponding to the background around the plant.

2. The lighting device according to claim 1 wherein the white light emitted by the fourth group of LEDs has a colour temperature between 4000-7000K.

3. The lighting device according to claim 1 wherein the white light emitted by the fourth group of LEDs has a colour temperature between 5000-6000 K.

4. The lighting device according to claim 1 wherein the ratio of the number of LEDs from each group of LEDs in the device is as follows:—
Group 1: 6+/−3
Group 2: 10+/−5
Group 3: 4+/−2
Group 4: 16+/−8.

5. The lighting device according to claim 4 wherein ratio of the number of LEDs from each group of LEDs in the device is as follows:—
Group 1: 6+/−1
Group 2: 10+/−2
Group 3: 4+/−1
Group 4: 16+/−6.

6. The lighting device according to claim 4 wherein ratio of the number of LEDs from each group of LEDs in the device is as follows:—
Group 1: 6
Group 2: 10
Group 3: 4
Group 4: 16.

7. The lighting device according to claim 4 wherein ratio of the number of LEDs from each group of LEDs in the device is as follows:—
Group 1: 6
Group 2: 8
Group 3: 4
Group 4: 10.

8. The lighting device according to claim 1 wherein the device is devoid of LEDs having a peak in their emission spectrum between 500-600 nm (green light).

9. The lighting device according to claim 1 wherein the device further comprising dimming/control circuitry adapted to allow the emission spectrum of the light emitted by the device to be controlled by au operator.

10. The lighting device according to claim 1 wherein the lighting device further comprises a housing comprising a main body and a heat sink, the LEDs being mounted in thermal contact with the heat sink and the heat sink being in good thermal contact with the main body, such that heat from the heat sink is dissipated through the main body.

11. The lighting device according to claim 10 wherein the lighting device further comprises a waterproof seal located between the main body and the heat sink which does not interfere with heat conduction between the heat sink and the main body.

12. The lighting device according to claim 1 wherein the lighting device further comprises an array of lenses, one lens for each LED, wherein each lens comprises a substantially hollow substantially hemispherical lens having a light entering region and a light emitting region, the light entering region located in the hollow of the hemisphere incorporating a plurality convex refractive surfaces.

13. The lighting device according to claim 1 wherein the low resolution CMOS device comprises a device having 1024 pixels.

14. A lighting device suitable for promoting plant growth, said lighting device comprising:—
(i) first group of LEDs comprising a plurality of LEDs adapted to generate a first emission spectrum having a peak between 450-460 nm (royal blue light);
(ii) a second group of LEDs comprising a plurality of LEDS adapted to generate a second emission spectrum having a peak between 630-670 nm (crimson light);
(iii) a third group of LEDs comprising a plurality of LEDs adapted to generate a third emission spectrum having a peak between 720-740 nm (cherry red light);
(iv) a fourth group of LEDs comprising a plurality of LEDs adapted to generate white light;
the intensity of the light output generated by each group of LEDs being adjustable independently of the other groups;
wherein the lighting device further comprises an array of lenses, each individual lens comprising a light entering section in the form of a blind recess and a light emitting section, the outer surface of the light emitting section being substantially hemispherical and at least part of the internal, light receiving surface of the light entering section incorporating a high density of small convex facets.

15. A light fitting suitable for promoting plant growth, said light fitting comprising:—
One or more housings;
one or more lighting devices as claimed claim 14;
a connection to a power supply;
a driver;
a connection to a control module.

16. The lighting device according to claim 14 wherein the high density of small convex facets comprise at least 50 small convex facets.

17. The lighting device according to claim 14 wherein the high density of small convex facets comprise at least 100 small convex facets.

18. The lighting device according to claim 14 wherein the high density of small convex facets comprise at least 150 small convex facets.

* * * * *